US011668957B2

(12) United States Patent
Takahashi

(10) Patent No.: US 11,668,957 B2
(45) Date of Patent: Jun. 6, 2023

(54) OPTICAL PRODUCT, PLASTIC SPECTACLE LENS, AND SPECTACLES

(71) Applicant: TOKAI OPTICAL CO., LTD., Okazaki (JP)

(72) Inventor: Hirotoshi Takahashi, Okazaki (JP)

(73) Assignee: TOKAI OPTICAL CO., LTD, Okazaki (JP)

( * ) Notice: Subject to any disclaimer, the term of this patent is extended or adjusted under 35 U.S.C. 154(b) by 209 days.

(21) Appl. No.: 16/254,873

(22) Filed: Jan. 23, 2019

(65) Prior Publication Data
US 2019/0155058 A1 May 23, 2019

Related U.S. Application Data

(63) Continuation of application No. PCT/JP2017/027848, filed on Aug. 1, 2017.

(30) Foreign Application Priority Data

Aug. 26, 2016 (JP) .............................. JP2016-165936

(51) Int. Cl.
*G02C 7/10* (2006.01)
*G02B 1/115* (2015.01)
(Continued)

(52) U.S. Cl.
CPC ................ *G02C 7/10* (2013.01); *G02B 1/115* (2013.01); *G02B 5/08* (2013.01); *G02B 5/26* (2013.01); *G02B 5/28* (2013.01); *G02C 2202/16* (2013.01)

(58) Field of Classification Search
CPC ...... G02C 7/10; G02C 2202/16; G02C 7/104; G02B 1/115; G02B 5/26; G02B 5/08; G02B 5/28; G02B 5/281; G02B 5/0833
See application file for complete search history.

(56) References Cited

U.S. PATENT DOCUMENTS 5,871,268 A * 2/1999 Edens ................. G02B 6/0006
362/293
2004/0099972 A1 5/2004 Morris et al.
(Continued)

FOREIGN PATENT DOCUMENTS

EP 2 775 341 A1 9/2014
JP 2007/127861 A1 5/2007
(Continued)

OTHER PUBLICATIONS

International Search Report and Written Opinion (Application No. PCT/JP2017/027848) dated Sep. 12, 2017.
(Continued)

*Primary Examiner* — Balram T Parbadia
*Assistant Examiner* — Gabriel A Sanz
(74) *Attorney, Agent, or Firm* — Burr Patent Law, PLLC

(57) ABSTRACT

The optical product includes an optical multilayer film which is disposed on one surface or both surfaces of a base directly or via an intermediate film. The optical multilayer film is obtained by alternately disposing an $SiO_2$ layer and a $ZrO_2$ layer, forming nine layers in total, such that a first layer counting from the base is the $SiO_2$ layer. The optical thickness of the $SiO_2$ layer as the first layer is not greater than $0.120\times\lambda/4$ when a design wavelength is $\lambda$ (500 nm), the optical thickness of the $ZrO_2$ layer as a second layer is not less than $0.400\times\lambda/4$, the optical thickness of the $SiO_2$ layer as a third layer is not less than $0.230\times\lambda/4$, and the optical thickness of the $SiO_2$ layer as a seventh layer is not less than $0.450\times\lambda/4$.

12 Claims, 9 Drawing Sheets

(51) Int. Cl.
*G02B 5/26* (2006.01)
*G02B 5/08* (2006.01)
*G02B 5/28* (2006.01)

(56) References Cited

U.S. PATENT DOCUMENTS

| | | | |
|---|---|---|---|
| 2007/0188635 A1* | 8/2007 | Yamaguchi | H01L 27/14627 |
| | | | 348/272 |
| 2012/0154916 A1* | 6/2012 | Nishimoto | G02B 1/115 |
| | | | 359/580 |
| 2014/0078589 A1 | 3/2014 | Fujii et al. | |
| 2016/0306194 A1 | 10/2016 | Takahashi | |
| 2017/0003520 A1* | 1/2017 | Iwasaki | G02B 5/283 |
| 2017/0075144 A1 | 3/2017 | Matsui et al. | |
| 2018/0067339 A1* | 3/2018 | Miyamoto | G02C 7/104 |

FOREIGN PATENT DOCUMENTS

| | | |
|---|---|---|
| JP | 2014-056215 A1 | 3/2014 |
| JP | 2015-148643 A1 | 8/2015 |
| WO | 2015/080160 A1 | 6/2015 |
| WO | 2015/097169 A1 | 7/2015 |
| WO | 2015/137282 A1 | 9/2015 |

OTHER PUBLICATIONS

Extended European Search Report (Application No. 17843336.3) dated Feb. 20, 2020.

* cited by examiner

OPTICAL PRODUCT, PLASTIC SPECTACLE LENS, AND SPECTACLES

This application is a Continuation of International Application No. PCT/JP2017/027848, filed on Aug. 1, 2017, which claims the benefit of Japanese Patent Application Number 2016-165936 filed on Aug. 26, 2016, the disclosures of which are incorporated by reference herein in their entireties.

BACKGROUND OF THE INVENTION

Field of the Invention

The present invention relates to optical products such as plastic spectacle lenses (including sunglass lenses), and spectacles (including sunglasses) that use the plastic spectacle lenses.

A plastic spectacle lens having a near-infrared reflective function, which is disclosed in Japanese Laid-Open Patent Publication No. 2015-148643, has been known.

This lens includes an optical multilayer film. The optical multilayer film has a seven-layer structure in which low refractive index layers and high refractive index layers are alternately disposed. The high refractive index layers are formed from a material in which a refractive index for light having a wavelength of 500 nm (nanometers) is not less than 2.145. A predetermined high refractive index layer or a prescribed low refractive index layer is formed so as to have a thickness within a predetermined range.

Japanese Laid-Open Patent Publication No. 2015-148643 discloses the lens having the relatively high reflectance for near-infrared light. When a person wears the lens, the high reflectance avoids a situation where near-infrared light acts on his/her eye and causes eye strain or the like due to temperature rise, and a situation where near-infrared light acts on skin around the eye to cause wrinkles, looseness, etc.

In the lens disclosed in Japanese Laid-Open Patent Publication No. 2015-148643, however, the reflectance of visible light is a few percent or less over the entirety of a visible region, i.e. a wavelength region of the visible light, (visible light reflection preventing function). Thus, it cannot enhance a reflectance for a specific wavelength region within the visible region.

Therefore, in the lens disclosed in Japanese Laid-Open Patent Publication No. 2015-148643, for example, the reflectance cannot be enhanced for light in a wavelength region not shorter than 400 nm and not longer than 420 nm within the visible region while maintaining the near-infrared reflective function. That is, in the lens disclosed in Japanese Laid-Open Patent Publication No. 2015-148643, the near-infrared reflective function and the blue light reflective function cannot be achieved at the same time.

The blue light in such a wavelength region corresponds to light in a wavelength region close to an ultraviolet region in the entirety of blue light. It has been pointed out that such blue light acts on retinal tissues in an eye and becomes a remote cause of age-related macular degeneration. If the blue light can be reflected by a spectacle lens, retinal tissues in an eye can be protected. However, the lens disclosed in Japanese Laid-Open Patent Publication No. 2015-148643 can provide the near-infrared reflective function but cannot provide the blue light reflective function.

Therefore, it is an object of the present teaching to provide an optical product, a plastic spectacle lens, and spectacles, in which the reflectance is set to be relatively high for both near-infrared light and light in a predetermined wavelength region within a visible region, such as blue light, while the reflectance is reduced for light in the other part of the visible region.

SUMMARY OF THE INVENTION

To achieve the above object, in a first aspect of the present teaching, an optical product includes an optical multilayer film which is disposed on one surface or both surfaces of a base directly or via an intermediate film. The optical multilayer film is obtained by alternately disposing an $SiO_2$ layer and a $ZrO_2$ layer, forming nine layers in total, such that a first layer counting from the base is the $SiO_2$ layer. The optical thickness of the $SiO_2$ layer as the first layer is not greater than $0.120 \times \lambda/4$ when a design wavelength is $\lambda$ where $\lambda$ is 500 nm, the optical thickness of the $ZrO_2$ layer as a second layer is not less than $0.400 \times \lambda/4$, the optical thickness of the $SiO_2$ layer as a third layer is not less than $0.230 \times \lambda/4$, and the optical thickness of the $SiO_2$ layer as a seventh layer is not less than $0.450 \times \lambda/4$.

In a second aspect of the present teaching according to the above aspect, the optical thickness of the $ZrO_2$ layer as the second layer i-s may be not greater than $0.650 \times \lambda/4$.

In a third aspect of the present teaching according to the above aspects, the optical thickness of the $SiO_2$ layer as the third layer may be not greater than $0.560 \times \lambda/4$.

In a fourth aspect of the present teaching according to the above aspects, the optical thickness of the $SiO_2$ layer as the seventh layer may be not greater than $0.650 \times \lambda/4$.

In a fifth aspect of the present teaching according to the above aspects, an average value of reflectance on one surface in a range not shorter than 780 nm and not longer than 1500 nm may be not less than 20%.

In a sixth aspect of the teaching, a plastic spectacle lens uses the optical product according to the above aspects.

In a seventh aspect of the teaching, spectacles use the plastic spectacle lens according to the above aspects.

According to the present teaching, it is possible to advantageously provide an optical product, a plastic spectacle lens, and spectacles, in which the reflectance is set to be relatively high for both near-infrared light and light in a predetermined wavelength region within the visible region, such as blue light, while the reflectance is reduced for light in the other part of the visible region.

DETAILED DESCRIPTION OF THE INVENTION

Figure 1:
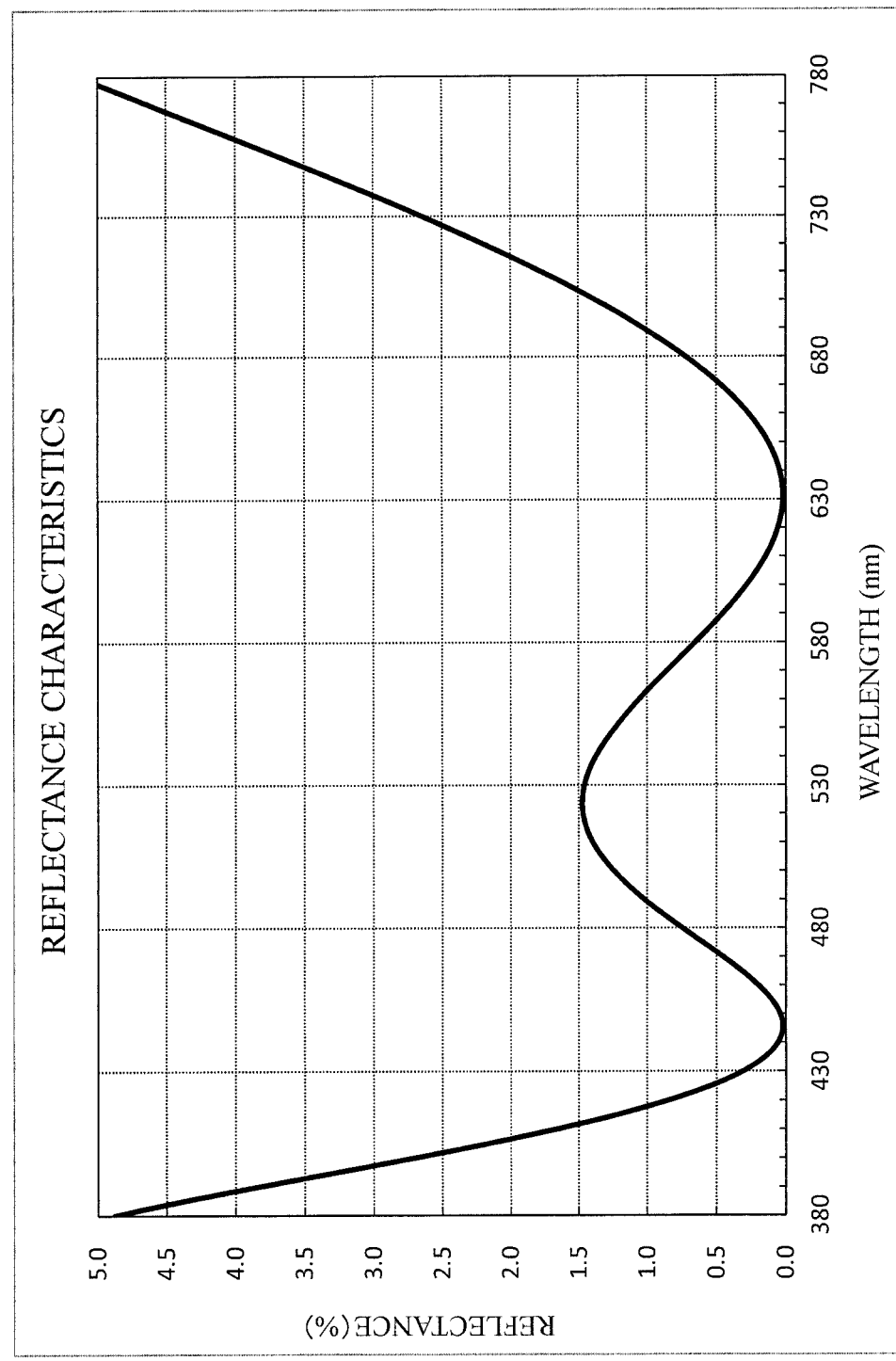
FIG. 1 is a graph showing distribution of reflectance at a concave surface according to Comparative Examples 1 to 4 and Examples 1 to 8.

An exemplary embodiment of the present teaching will be described below. The present teaching is not limited to the exemplary embodiments described below.

An optical product according to the present teaching has an optical multilayer film on one surface or both surfaces of a base.

In the present teaching, the base may be formed from any material, but is preferably translucent. As for a material of the base, a thermosetting resin is preferably used. Examples of the thermosetting resin include a polyurethane resin, a thiourethane resin, an episulfide resin, a polycarbonate resin, a polyester resin, an acrylic resin, a polyether sulfone resin, a poly(4-methylpentene-1) resin, a diethylene glycol bis (allyl carbonate) resin, and a combination thereof. Further, examples of the material of the base, which are preferable (for, in particular, a spectacle lens) because of their high refractive index, include an episulfide resin obtained by addition-polymerization of an episulfide group with polythiol and/or sulfur-containing polyol, and a combination of this episulfide resin and another resin.

The optical multilayer film has the following characteristics as appropriate. When the optical multilayer films are formed on the both surfaces, both of the films preferably have the following characteristics, and more preferably, have the same layered structure.

The optical multilayer film has a nine-layer structure as a whole in which low refractive index layers and high refractive index layers are alternately layered. Assuming that a layer closest to the base is a first layer, odd-numbered layers are the low refractive index layers and even-numbered layers are the high refractive index layers.

The low refractive index layers are $SiO_2$ layers formed by using silica (silicon dioxide, $SiO_2$), and the high refractive index layers are $ZrO_2$ layers formed by using zirconia (zirconium dioxide, $ZrO_2$).

The first layer ($SiO_2$ layer) is formed so as to have an optical thickness not greater than $0.120 \times \lambda/4$, with a design wavelength being $\lambda$ (here, 500 nm).

The seventh layer ($SiO_2$ layer) is formed so as to have an optical thickness not less than $0.450 \times \lambda/4$, preferably, not less than $0.450 \times \lambda/4$ and not greater than $0.650 \times \lambda/4$.

The second layer ($ZrO_2$ layer) is formed so as to have an optical thickness not less than $0.400 \times \lambda/4$, preferably, not less than $0.400 \times \lambda/4$ and not greater than $0.650 \times \lambda/4$.

The third layer ($SiO_2$ layer) is formed so as to have an optical thickness not less than $0.230 \times \lambda/4$, preferably, not less than $0.230 \times \lambda/4$ and not greater than $0.560 \times \lambda/4$.

The optical multilayer film is formed so that an average value of reflectance on one surface of the base is not less than 20% in a wavelength region not shorter than 780 nm and not longer than 1500 nm within a near infrared region.

The low refractive index layers and the high refractive index layers are formed by a vacuum deposition method, an ion-assisted deposition method, an ion plating method, a sputtering method, etc.

In the present teaching, another kind of film such as a hard coating film or an antifouling film (water repellent film/oil repellent film) may be additionally provided to at least one of a position between the optical multilayer film and the base, and a position on the surface of the optical multilayer film. When the optical multilayer films are formed on the both surfaces of the base, the films to be additionally provided on the respective surfaces may be different from each other, or presence/absence of the film may be changed between the both surfaces.

When a hard coating film is used as the film (intermediate film) additionally provided between the optical multilayer film and the base, the hard coating film is preferably formed by hard coat solution being uniformly applied to the surface of the base.

As for the hard coating film, an organosiloxane resin containing inorganic oxide particles can be preferably used. An organosiloxane resin obtained by hydrolyzing and condensing an alkoxysilane is preferably used. Specific examples of the organosiloxane resin include γ-glycidoxypropyltrimethoxysilane, γ-glycidoxypropyltriethoxysilane, methyl trimethoxysilane, ethyl silicate, and a combination thereof. The hydrolysis condensates of the alkoxysilanes are manufactured by hydrolyzing the alkoxysilane compounds or combinations thereof by an acidic aqueous solution such as hydrochloric acid.

Meanwhile, as an exemplary material of the inorganic oxide particles, specifically, a sol of zinc oxide, silicon dioxide (silica particulates), aluminum oxide, titanium oxide (titania particulates), zirconium oxide (zirconia particulates), tin oxide, beryllium oxide, antimony oxide, tungsten oxide, or cerium oxide, or mixed crystals of two or more of the sols, can be used. The diameter of the inorganic oxide particle is preferably not less than 1 nm and not greater than 100 nm, and more preferably not less than 1 nm and not greater than 50 nm, in order to ensure transparency of the hard coating film. The amount (concentration) of the inorganic oxide particles blended is preferably not less than 40 wt % (percent by weight) and not greater than 60 wt % of all the components of the hard coating film, in order to ensure appropriate levels of hardness and toughness of the hard coating film. In addition, the hard coat solution may contain, for example, at least one of an acetylacetone metal salt and an ethylenediaminetetraacetic acid metal salt, as a curing catalyst. Further, a surfactant, a colorant, a solvent, or the like may be added to the hard coat solution according to need for, for example, ensuring adhesion to the base, facilitating formation, and coloring with a desired (semi)transparent color.

The physical film thickness of the hard coating film is preferably not less than 0.5 μm (micrometer) and not greater than 4.0 μm. As for the lower limit of the film thickness range, if the thickness is less than this lower limit, it is difficult to obtain sufficient hardness. Meanwhile, as for the upper limit of the film thickness range, if the thickness is greater than this upper limit, the risk of a problem regarding physical properties, such as generation of cracks or fragility, is significantly increased.

Further, a primer layer may be additionally provided between the hard coating film and the base surface, in order to improve adhesion of the hard coating film. Examples of the material of the primer layer include a polyurethane-based resin, an acrylic resin, a methacrylic resin, an organosilicon resin, and a combination thereof. The primer layer is preferably formed by uniformly applying a primer solution on the surface of the base. The primer solution is a solution obtained by mixing the above-described resin material and inorganic oxide particles in water or an alcohol solvent.

In the above-described optical product, the base is preferably a plastic spectacle lens base, and the optical product is preferably a plastic spectacle lens. By using the plastic spectacle lens, spectacles having excellent durability can be produced, in which the reflectance is set to be relatively high for both near-infrared light and light in a predetermined wavelength region within a visible region, such as blue light, while the reflectance is reduced for light in the other part of the visible region.

EXAMPLES

Next, Examples 1-1 to 8-3 of the present teaching, and Comparative Examples 1-1 to 4-3 which do not belong to the present invention, will be described with reference to the drawings. The present teaching is not limited to the Examples below.

<<Base and Intermediate Film>>

These Examples and Comparative Examples are plastic lenses. Each of bases of the plastic lenses is formed from a thermosetting resin for spectacles, and is an aspherical lens base which has a circular shape, a standard size as a plastic lens for spectacles, and a power of S-2.00. More specifically, the base is any of three types of bases as follows.

A first base is formed from a thiourethane resin, and has a refractive index of 1.60, an Abbe number of 42, a specific gravity of 1.30 g/ml (gram per milliliter), and a glass transition temperature of 99° C. (base having refractive index of 1.60). The glass transition temperature is measured with a differential scanning calorimeter, and the same applies to the following.

A second base is formed from an episulfide resin obtained by addition-polymerization of an episulfide group with at least one of polythiol and sulfur-containing polyol, and has a refractive index of 1.70, an Abbe number of 36, a specific gravity of 1.41 g/ml, and a glass transition temperature of 67° C. (base having refractive index of 1.70).

A third base is formed from an episulfide resin, and has a refractive index of 1.76, an Abbe number of 30, a specific gravity of 1.49 g/ml, and a glass transition temperature of 59° C. (base having refractive index of 1.76).

Samples using the first base are denoted by numbers ending in "1" (Example 1-1, Comparative Example 4-1, etc.). Samples using the second base are denoted by numbers ending in "2" (Example 1-2, Comparative Example 4-2, etc.). Samples using the third base are denoted by numbers ending in "3" (Example 1-3, Comparative Example 4-3, etc.).

In each of these Examples and Comparative Examples, as an intermediate film, a hard coating film formed by application of a hard coat solution was provided to both surfaces of the base.

The hard coating film in contact with the plastic lens base was manufactured as follows.

First, 206 g (grams) of methanol, 300 g of a methanol-dispersed titania sol (made by JGC Catalysts and Chemicals Ltd., solid content: 30%), 60 g of γ-glycidoxypropyltrimethoxysilane, 30 g of γ-glycidoxypropylmethyldiethoxysilane, and 60 g of tetraethoxysilane were dropped into a container, and 0.01 N (normality) of a hydrochloric acid aqueous solution was dropped into the mixed solution. The resultant mixed solution was stirred and hydrolyzed. Then, 0.5 g of a flow regulating agent and 1.0 g of a catalyst were added, and the resultant mixed solution was stirred at room temperature for 3 hours. Thus, the hard coat solution was produced.

This hard coat solution was applied to each surface of the plastic lens base as follows.

The hard coat solution was uniformly applied by a spin coating method, and was left in an environment of 120° C. for 1.5 hours, whereby the hard coat solution was heat-cured.

In any of the hard coating films formed as described above, the physical film thickness was 2.5 μm.

<<Optical Multilayer Film (Concave Surface Side)>>

In each of these Examples and Comparative Examples, the optical multilayer film on the concave surface side was formed, on the intermediate film, as a general five-layer laminated film (antireflection film) in which low refractive index layers (odd-numbered layers L1, L3, L5 with a layer closest to the base being the first layer L1) and high refractive index layers (even-numbered layers L2, L4) are alternately layered.

In the concave-surface-side optical multilayer film, the low refractive index layers are $SiO_2$ layers while the high refractive index layers are $ZrO_2$ layers. The optical thicknesses of the respective layers in Examples 1 to 8 and Comparative Examples 1 to 4 are represented as shown in Table 1 below.

In general, an optical thickness is expressed by the following formula (1). The value of each optical thickness in Table 1 is obtained by dividing the optical thickness in formula (1) by 2¼, in order to indicate how many times larger the optical thickness is than ¼ of a noticed design wavelength λ, based on the fact that the phases of light are matched or inverted for every wavelength corresponding to ¼ of the optical thickness.

$$\text{optical thickness} = (\text{refractive index} \times \text{physical thickness})/\text{design wavelength } \lambda \quad (1)$$

TABLE 1

|  |  | Material | Optical thickness × (λ/4) |
|---|---|---|---|
| Layer structure | L1 (base side) | $SiO_2$ | 0.198 |
|  | L2 | $ZrO_2$ | 0.064 |
|  | L3 | $SiO_2$ | 0.064 |
|  | L4 | $ZrO_2$ | 0.398 |
|  | L5 (atmosphere side) | $SiO_2$ | 0.219 |

<<Optical Multilayer Film (Convex Surface Side)>>

Meanwhile, in each of these Examples and Comparative Examples, the optical multilayer film on the convex surface side was formed on the intermediate film, basically as follows.

A dome, in which a base with an intermediate film was set, was charged into a vacuum apparatus through a door, the door was closed, and the vacuum apparatus was evacuated.

The temperature in the vacuum apparatus was set at 60° C., and deposition of the optical multilayer film was started when the degree of vacuum in the vacuum apparatus reached 7.0E-04 Pa (pascal). Here, "7.0E-04" indicates "$7.0 \times 10^{-4}$".

In advance of deposition, the surface of the base (intermediate film) was irradiated with oxygen ions for 60 seconds to activate the surface, thereby enhancing adhesion between the intermediate film and the optical multilayer film to be deposited.

Then, a low refractive index material and a high refractive index material were alternately vapor-deposited, thereby forming the optical multilayer film which includes low refractive index layers and high refractive index layers alternately.

As the low refractive index material, silica ("$SiO_2$" produced by Canon Optron Inc.) was used, and the deposition rate of the low refractive index material was 10.0 Å/s (angstrom per second). The low refractive index layer deposited as described above had a refractive index of 1.4815 with respect to light having a wavelength of 550 nm.

As the high refractive index material, zirconia ("$ZrO_2$" produced by Canon Optron Inc.) was used, and the deposition rate of the high refractive index material was 6.0 Å/s. The high refractive index layer deposited as described above had a refractive index of 2.0743 with respect to light having a wavelength of 550 nm.

The optical thicknesses (divided by λ/4) of the respective layers in Comparative Examples 1 to 4 are shown in the upper part of the following Table 2. The optical thicknesses (divided by λ/4) of the respective layers in Examples 1 to 4 are shown in the upper part of the following Table 3. The optical thicknesses (divided by λ/4) of the respective layers in Examples 5 to 8 are shown in the upper part of the following Table 4.

In Comparative Examples 1-1 to 1-3, optical multilayer films (convex surfaces) of the same structure were formed, and these Comparative Examples may be collectively referred to as Comparative Example 1. The same applies to Comparative Examples 2-1 to 2-3, etc., and to Examples 1-1 to 1-3, etc.

TABLE 2

| | | Comparative Example 1 | | Comparative Example 2 | | Comparative Example 3 | | Comparative Example 4 | |
|---|---|---|---|---|---|---|---|---|---|
| | | Material | Optical thickness × (λ/4) | Material | Optical thickness × (λ/4) | Material | Optical thickness × (λ/4) | Material | Optical thickness × (λ/4) |
| Layer structure | L1 (base side) | $SiO_2$ | 0.369 | $SiO_2$ | 0.350 | $SiO_2$ | 0.228 | $ZrO_2$ | 0.181 |
| | L2 | $ZrO_2$ | 0.545 | $ZrO_2$ | 0.498 | $ZrO_2$ | 0.486 | $SiO_2$ | 0.129 |
| | L3 | $SiO_2$ | 0.106 | $SiO_2$ | 0.275 | $SiO_2$ | 0.332 | $ZrO_2$ | 0.172 |
| | L4 | $ZrO_2$ | 0.588 | $ZrO_2$ | 0.081 | $ZrO_2$ | 0.065 | $SiO_2$ | 0.202 |
| | L5 | $SiO_2$ | 0.494 | $SiO_2$ | 0.121 | $SiO_2$ | 0.089 | $ZrO_2$ | 0.152 |
| | L6 | $ZrO_2$ | 0.318 | $ZrO_2$ | 0.235 | $ZrO_2$ | 0.290 | $SiO_2$ | 0.143 |
| | L7 | $SiO_2$ | 0.250 | $SiO_2$ | 0.503 | $SiO_2$ | 0.529 | $ZrO_2$ | 0.219 |
| | L8 | — | | $ZrO_2$ | 0.309 | $ZrO_2$ | 0.182 | $SiO_2$ | 0.326 |
| | L9 (atmosphere side) | — | | $SiO_2$ | 0.249 | $SiO_2$ | 0.295 | — | |
| Appearance after deposition | | Result of appearance check | | Result of appearance check | | Result of appearance check | | Result of appearance check | |
| Base having refractive index of 1.60 | | No problem | | No problem | | No problem | | No problem | |
| Base having refractive index of 1.70 | | Many linear cracks | | No problem | | No problem | | No problem | |
| Base having refractive index of 1.76 | | Many linear cracks | | No problem | | No problem | | No problem | |
| Near-infrared region reflectance (%) | | 23.27 | | 23.33 | | 22.10 | | 7.03 | |

TABLE 3

| | | Example 1 | | Example 2 | | Example 3 | | Example 4 | |
|---|---|---|---|---|---|---|---|---|---|
| | | Material | Optical thickness × (λ/4) | Material | Optical thickness × (λ/4) | Material | Optical thickness × (λ/4) | Material | Optical thickness × (λ/4) |
| Layer structure | L1 (base side) | $SiO_2$ | 0.094 | $SiO_2$ | 0.086 | $SiO_2$ | 0.092 | $SiO_2$ | 0.067 |
| | L2 | $ZrO_2$ | 0.536 | $ZrO_2$ | 0.523 | $ZrO_2$ | 0.578 | $ZrO_2$ | 0.558 |
| | L3 | $SiO_2$ | 0.551 | $SiO_2$ | 0.247 | $SiO_2$ | 0.485 | $SiO_2$ | 0.537 |
| | L4 | $ZrO_2$ | 0.245 | $ZrO_2$ | 0.078 | $ZrO_2$ | 0.078 | $ZrO_2$ | 0.098 |
| | L5 | $SiO_2$ | 0.046 | $SiO_2$ | 0.101 | $SiO_2$ | 0.077 | $SiO_2$ | 0.113 |
| | L6 | $ZrO_2$ | 0.201 | $ZrO_2$ | 0.316 | $ZrO_2$ | 0.227 | $ZrO_2$ | 0.154 |
| | L7 | $SiO_2$ | 0.622 | $SiO_2$ | 0.468 | $SiO_2$ | 0.548 | $SiO_2$ | 0.614 |
| | L8 | $ZrO_2$ | 0.109 | $ZrO_2$ | 0.336 | $ZrO_2$ | 0.390 | $ZrO_2$ | 0.449 |
| | L9 (atmosphere side) | $SiO_2$ | 0.332 | $SiO_2$ | 0.231 | $SiO_2$ | 0.252 | $SiO_2$ | 0.242 |
| Appearance after deposition | | Result of appearance check | | Result of appearance check | | Result of appearance check | | Result of appearance check | |
| Base having refractive index of 1.60 | | No problem | | No problem | | No problem | | No problem | |
| Base having refractive index of 1.70 | | No problem | | No problem | | No problem | | No problem | |
| Base having refractive index of 1.76 | | No problem | | No problem | | No problem | | No problem | |
| Near-infrared region reflectance (%) | | 23.42 | | 24.63 | | 26.15 | | 24.97 | |

TABLE 4

| | | Example 5 | | Example 6 | | Example 7 | | Example 8 | |
|---|---|---|---|---|---|---|---|---|---|
| | | Material | Optical thickness × (λ/4) | Material | Optical thickness × (λ/4) | Material | Optical thickness × (λ/4) | Material | Optical thickness × (λ/4) |
| Layer structure | L1 (base side) | $SiO_2$ | 0.067 | $SiO_2$ | 0.078 | $SiO_2$ | 0.102 | $SiO_2$ | 0.094 |
| | L2 | $ZrO_2$ | 0.641 | $ZrO_2$ | 0.596 | $ZrO_2$ | 0.406 | $ZrO_2$ | 0.494 |
| | L3 | $SiO_2$ | 0.544 | $SiO_2$ | 0.531 | $SiO_2$ | 0.402 | $SiO_2$ | 0.421 |
| | L4 | $ZrO_2$ | 0.103 | $ZrO_2$ | 0.045 | $ZrO_2$ | 0.258 | $ZrO_2$ | 0.107 |
| | L5 | $SiO_2$ | 0.081 | $SiO_2$ | 0.154 | $SiO_2$ | 0.049 | $SiO_2$ | 0.057 |
| | L6 | $ZrO_2$ | 0.185 | $ZrO_2$ | 0.155 | $ZrO_2$ | 0.069 | $ZrO_2$ | 0.229 |
| | L7 | $SiO_2$ | 0.593 | $SiO_2$ | 0.640 | $SiO_2$ | 0.460 | $SiO_2$ | 0.483 |
| | L8 | $ZrO_2$ | 0.388 | $ZrO_2$ | 0.385 | $ZrO_2$ | 0.338 | $ZrO_2$ | 0.395 |
| | L9 (atmosphere side) | $SiO_2$ | 0.253 | $SiO_2$ | 0.261 | $SiO_2$ | 0.206 | $SiO_2$ | 0.231 |
| Appearance after deposition | | Result of appearance check | | Result of appearance check | | Result of appearance check | | Result of appearance check | |
| Base having refractive index of 1.60 | | No problem | | No problem | | No problem | | No problem | |
| Base having refractive index of 1.70 | | No problem | | No problem | | No problem | | No problem | |
| Base having refractive index of 1.76 | | No problem | | No problem | | No problem | | No problem | |
| Near-infrared region reflectance (%) | | 26.17 | | 22.99 | | 25.85 | | 26.45 | |

The optical multilayer film (convex surface) of Comparative Example 1 has a seven-layer structure in which the optical thickness of the first layer L1 ($SiO_2$ layer) counting from the base side is greater than 0.120×λ/4, the optical thickness of the outermost seventh layer L7 ($SiO_2$ layer) is less than 0.450×λ/4, and the optical thickness of the third layer L3 ($SiO_2$ layer) is less than 0.230×λ/4.

The optical multilayer film (convex surface) of Comparative Example 2 has a nine-layer structure in which the optical thickness of the first layer L1 ($SiO_2$ layer) is greater than 0.120×λ/4.

The optical multilayer film (convex surface) of Comparative Example 3 has a nine-layer structure in which the optical thickness of the first layer L1 ($SiO_2$ layer) is greater than 0.120×λ/4.

The optical multilayer film (convex surface) of Comparative Example 4 has an eight-layer structure in which the first layer L1 is a $ZrO_2$ layer.

In contrast to these Comparative Examples, each of the optical multilayer films (convex surfaces) of Examples 1 to 8 has a nine-layer structure in which the optical thickness of the first layer L1 ($SiO_2$ layer) is not greater than 0.120×λ/4, the optical thickness of the seventh layer L7 ($SiO_2$ layer) is not less than 0.450×λ/4 and not greater than 0.650×λ/4, the optical thickness of the second layer L2 ($ZrO_2$ layer) is not less than 0.400×λ/4 and not greater than 0.650×λ/4, and the optical thickness of the third layer L3 ($SiO_2$ layer) is not less than 0.230×λ/4 and not greater than 0.560×λ/4.

<<Appearance>>

Regarding Comparative Examples 1-1 to 4-3, the appearances thereof after formation of the optical multilayer film (convex surface) were visually checked. The results are shown in a middle part of the above Table 2.

Regarding Examples 1-1 to 4-3 and 5-1 to 8-3, the appearances thereof after formation of the optical multilayer film (convex surface) were visually checked. The results are shown in middle parts of the above Table 3 and Table 4.

Among Comparative Examples 1, many linear cracks were observed at the convex surfaces in Comparative Example 1-2 (base having refractive index of 1.70) and Comparative Example 1-3 (base having refractive index of 1.76). In other Comparative Examples and in Examples, abnormality such as cracks was not observed in appearances.

<<Distribution of Reflectance in Visible Region and Adjacent Region>>

Regarding Comparative Examples 1 to 4 and Examples 1 to 8, distributions of reflectance at the concave surfaces thereof were measured by using a reflectometer (USPM-RU made by OLYMPUS CORPORATION).

Since these convex-surface reflectance distributions are similar to each other, distribution of Comparative Example 1-1 is representatively shown in FIG. 1.

Meanwhile, distributions of reflectance at the convex surfaces in the Comparative Examples and Examples were measured in a similar manner.

Figure 2:
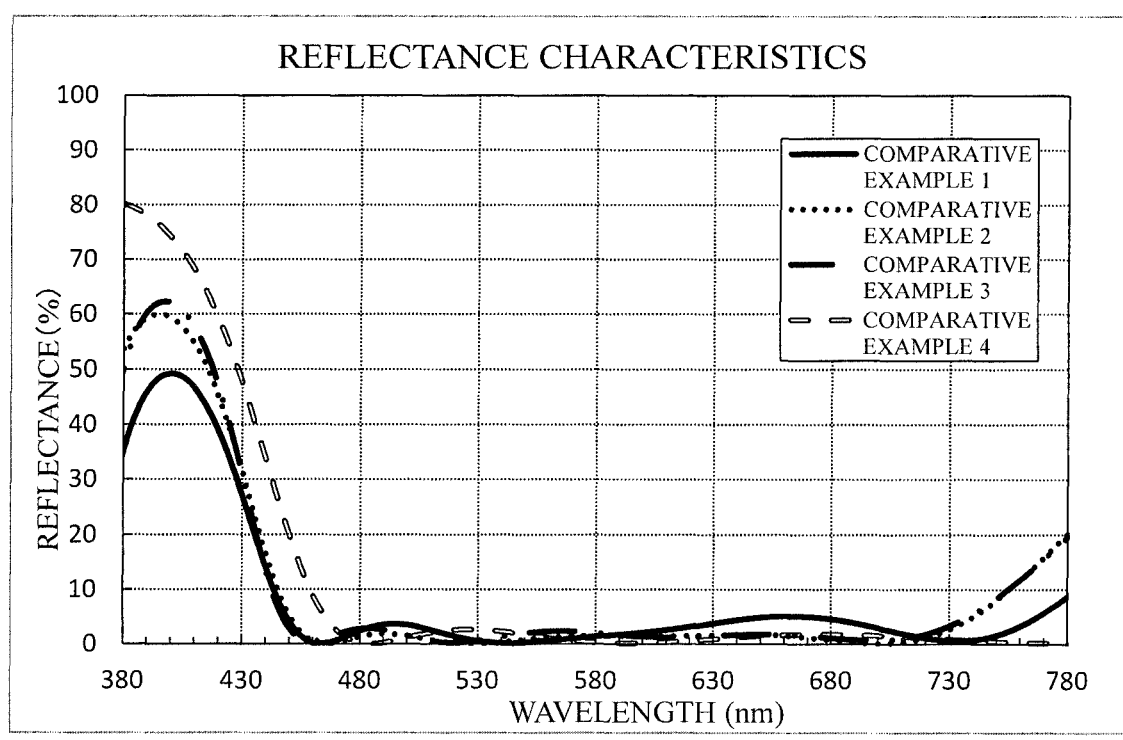
FIG. 2 is a graph showing distribution of reflectance at a convex surface regarding a visible region and an adjacent region, according to Comparative Examples 1 to 4.
Figure 3:
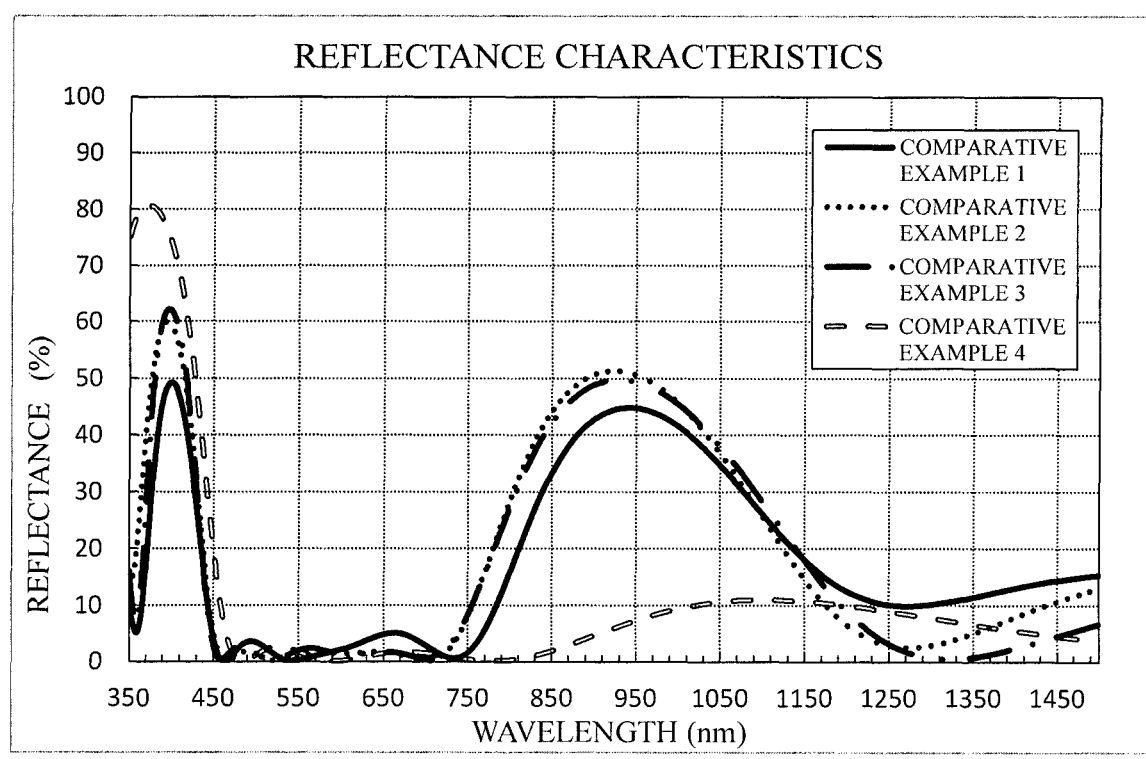
FIG. 3 is a graph showing distribution of reflectance at a convex surface regarding a visible region, an adjacent region, and a wavelength region corresponding to a part of a near-infrared region, according to Comparative Examples 1 to 4.

The convex-surface reflectance distributions regarding Comparative Examples 1-1 to 1-3 are similar to each other. As the convex-surface reflectance distribution of Comparative Example 1, the distribution of Comparative Example 1-1 is representatively shown in FIG. 2 and FIG. 3. FIG. 2 shows the distribution regarding the visible region (having a wavelength not shorter than 400 nm and not longer than 780 nm) and an adjacent region (in total, having a wavelength not shorter than 380 nm and not longer than 780 nm). FIG. 3 shows the distribution regarding the visible region, the adjacent region, and a wavelength region (not shorter than 780 nm and not longer than 1500 nm) corresponding to a part of the near-infrared region (in total, having a wavelength not shorter than 350 nm and not longer than 1500 nm). Likewise, convex-surface reflectance distributions of Comparative Examples 2 to 4 are also shown in FIG. 2 and FIG. 3.

Figure 4:
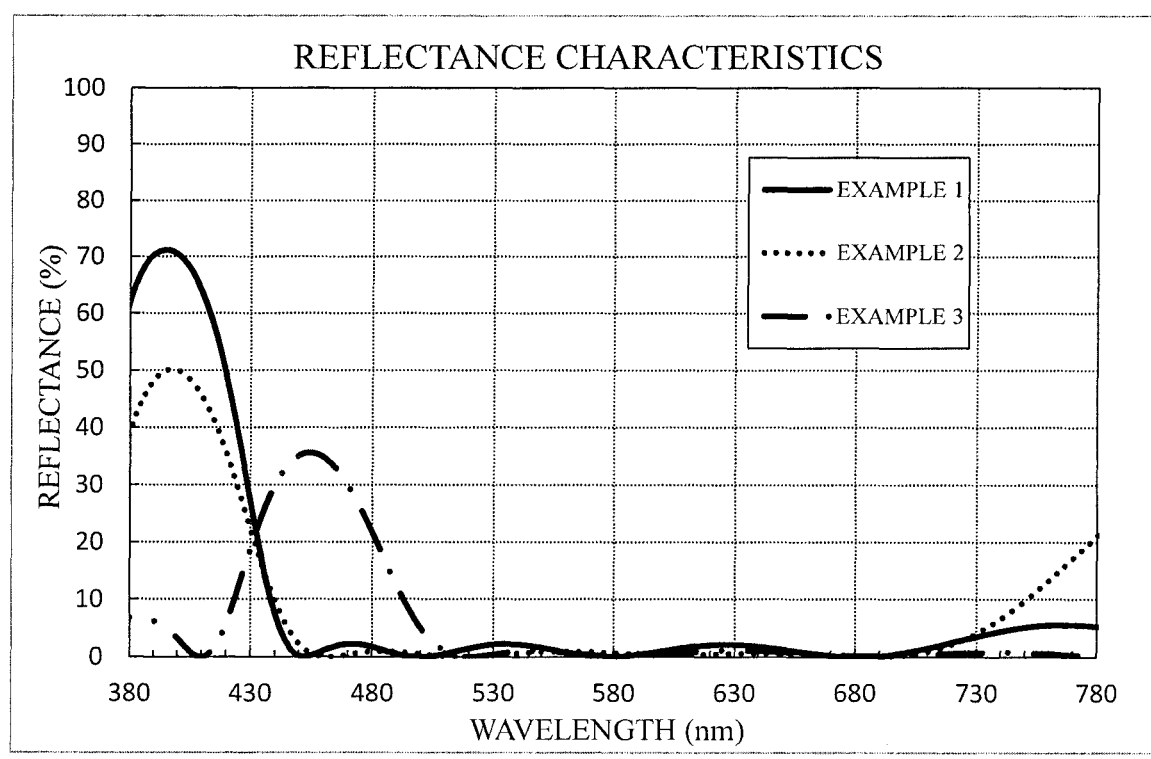
FIG. 4 is a graph similar to FIG. 2, according to Examples 1 to 3.
Figure 5:
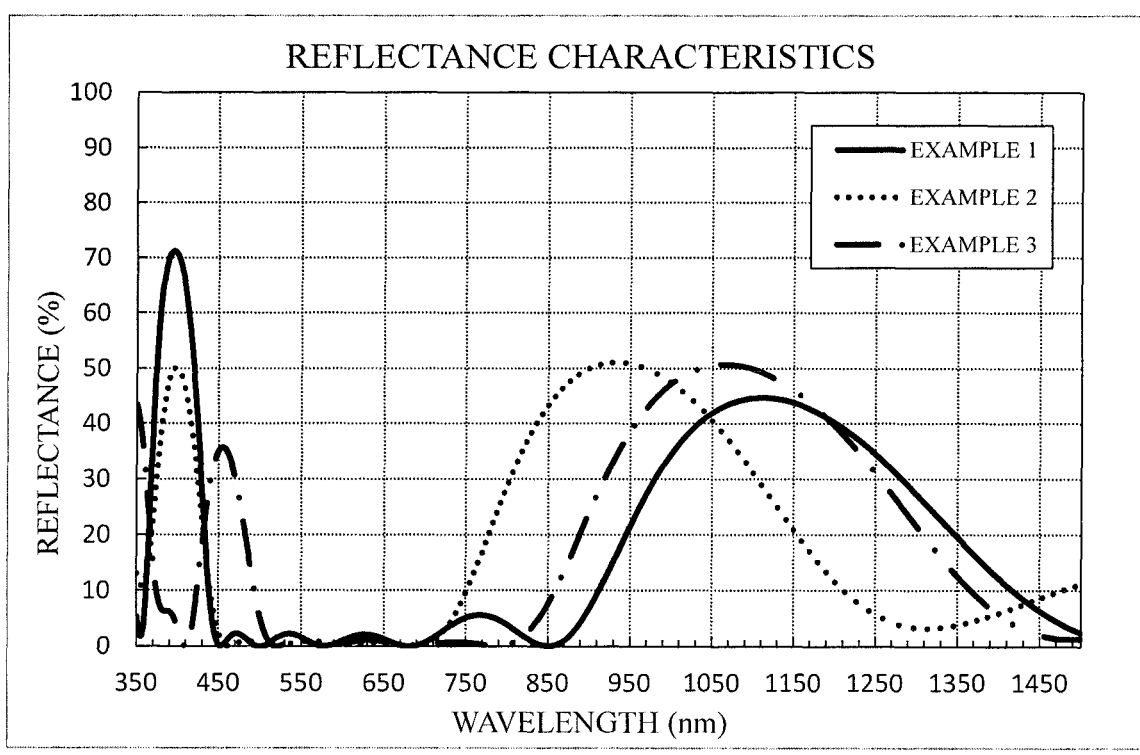
FIG. 5 is a graph similar to FIG. 3, according to Examples 1 to 3.
Figure 6:
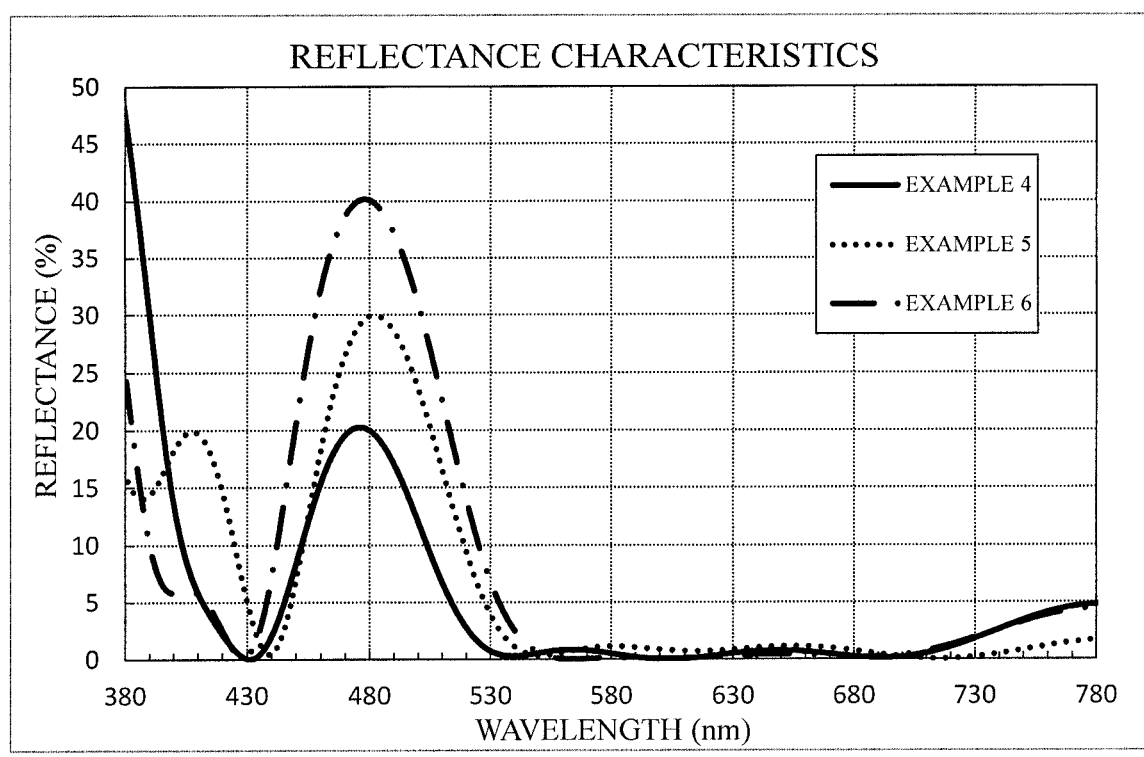
FIG. 6 is a graph similar to FIG. 2, according to Examples 4 to 6.
Figure 7:
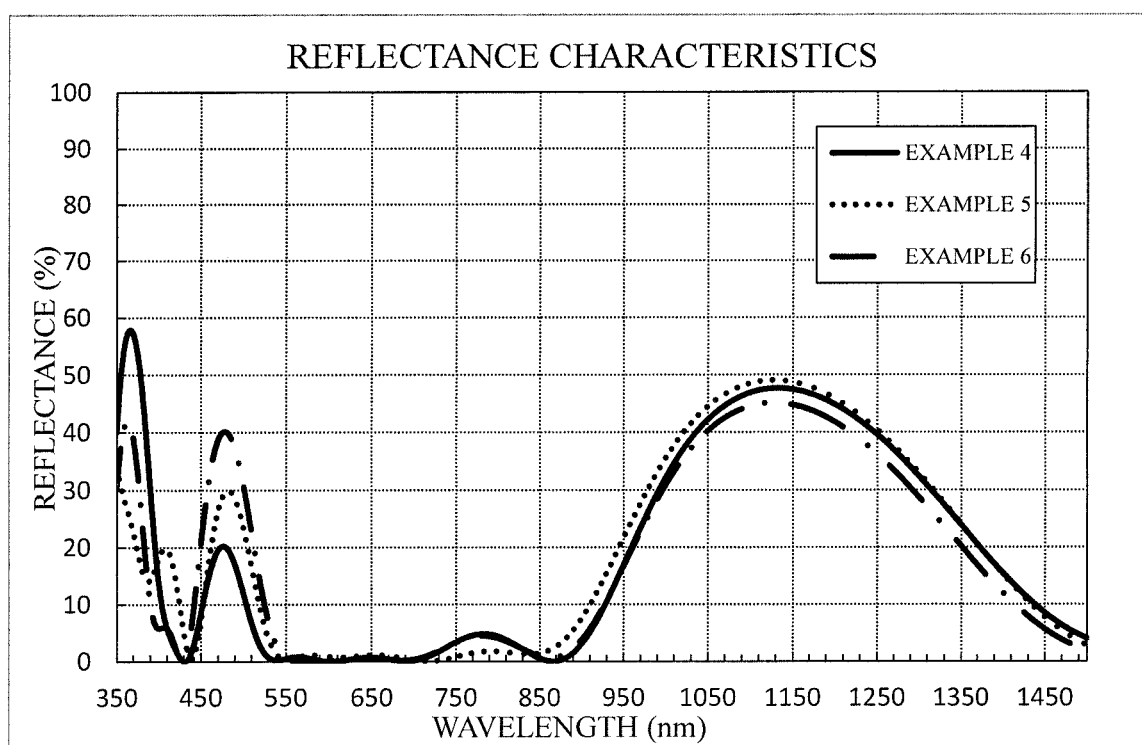
FIG. 7 is a graph similar to FIG. 3, according to Examples 4 to 6.
Figure 8:
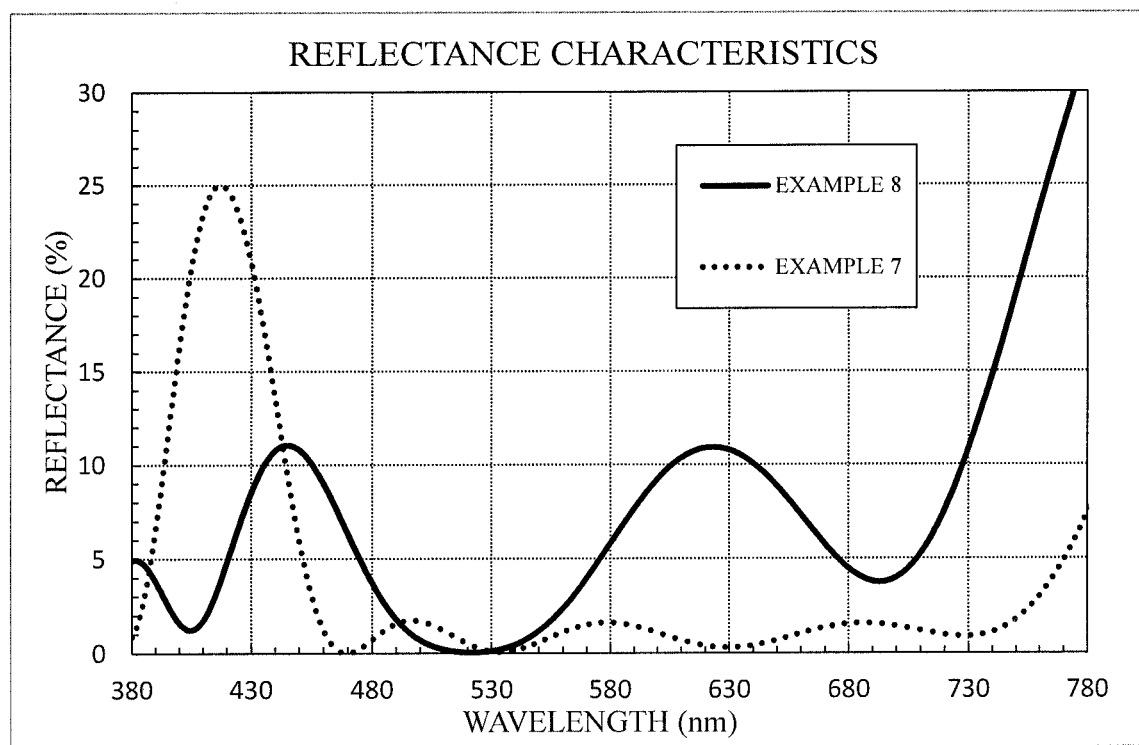
FIG. 8 is a graph similar to FIG. 2, according to Examples 7 to 8.
Figure 9:
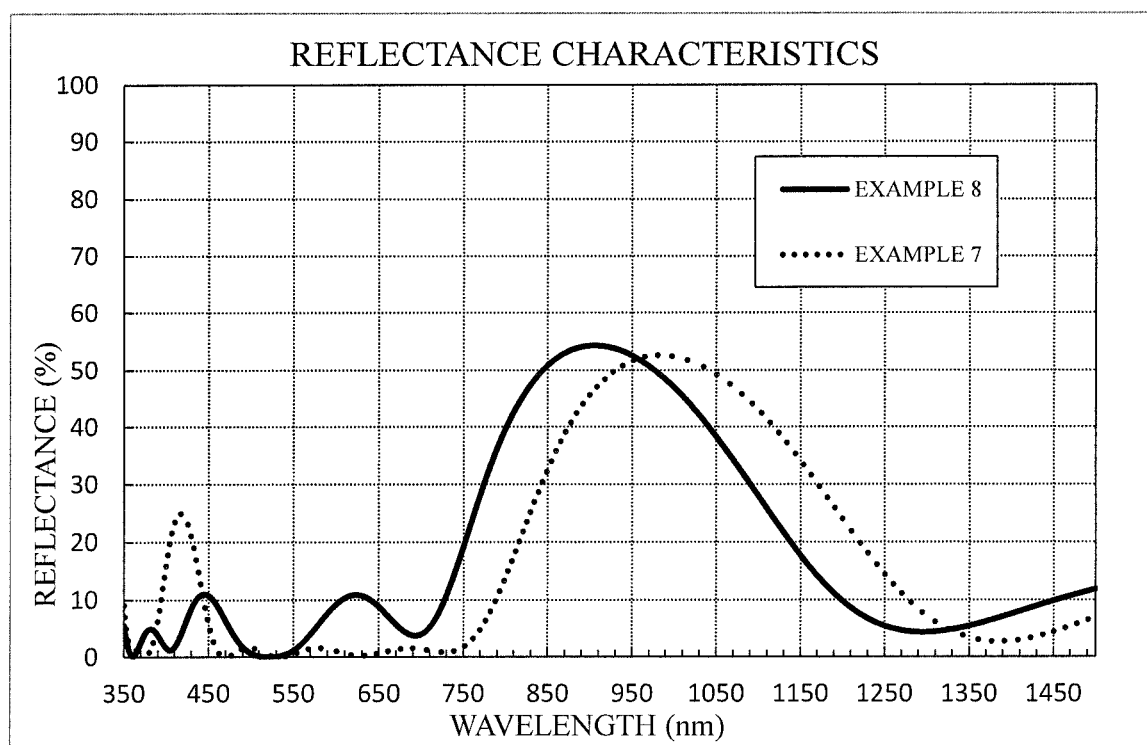
FIG. 9 is a graph similar to FIG. 3, according to Examples 7 to 8.

The convex-surface reflectance distributions of Examples 1-1 to 1-3 are similar to each other. As the convex-surface reflectance distribution of Example 1, the distribution of Example 1-1 is representatively shown in FIG. 4 and FIG. 5. FIG. 4 shows the distribution regarding the visible region and the adjacent region (having a wavelength not shorter than 380 nm and not longer than 780 nm in total). FIG. 5 shows the distribution regarding the visible region, the near infrared region, and the adjacent region (having a wavelength not shorter than 350 nm and not longer than 1500 nm in total). Likewise, convex-surface reflectance distributions of Examples 2 to 3 are also shown in FIG. 4 and FIG. 5. Furthermore, convex-surface reflectance distributions of Examples 4 to 6 are shown in FIG. 6 and FIG. 7, and convex-surface reflectance distributions of Examples 7 to 8 are shown in FIG. 8 and FIG. 9.

Average values of the convex-surface reflectances in the near-infrared region (near-infrared region reflectance [%]) in the Comparative Examples are shown in the lower part of the above Table 2, and near-infrared region reflectances in the Examples are shown in the lower parts of the above Table 3 and Table 4.

In each of Comparative Examples 1 to 4, the reflectance in the wavelength region of 400 nm±50 nm is higher than the reflectance in the visible region excluding this wavelength region, thereby providing a filter which reflects light having a wavelength around 400 nm.

In Comparative Examples 1 to 3, the average value of reflectance (near-infrared region reflectance) in the noticed near-infrared region, (not shorter than 780 nm and not longer than 1500 nm) is also relatively high (about 23%), and therefore, Comparative Examples 1 to 3 each have a near-infrared reflective function.

Meanwhile, in Comparative Example 4, the near-infrared region reflectance is as low as about 7%, and therefore, Comparative Example 4 does not have a sufficient near-infrared reflective function.

On the other hand, in Example 1, the reflectance in the wavelength region of 400 nm±50 nm is higher than the reflectance in the visible region excluding this wavelength region. In particular, the reflectance (maximum value) of light having a wavelength of 400 nm exceeds 70%, i.e., 71%. In addition, the reflectance in a wavelength region, which is on the shorter wavelength side of the visible region and is not shorter than 400 nm and not longer than 420 nm, exceeds 50% over the entirety of the wavelength region. Further, in the reflectance distribution of Example 1, there is a peak having a maximum value (44%) at the wavelength of 1100 nm in the noticed infrared region, and the near-infrared region reflectance is as high as 23.42%.

In Example 2, the reflectance in the wavelength region of 400 nm±50 nm is higher than the reflectance in the visible region excluding this wavelength region. In particular, the reflectance (maximum value) of light having a wavelength of 400 nm is 50%. In addition, the reflectance in the wavelength region, which is on the shorter wavelength side of the visible region and is not shorter than 400 nm and not longer than 420 nm, exceeds 30% over the entirety of the wavelength region. Further, in the reflectance distribution of Example 2, there is a peak having a maximum value (51%) at the wavelength of 930 nm in the noticed infrared region, and the near-infrared region reflectance is as high as 24.63%.

In Example 3, the reflectance in the wavelength region not shorter than 420 nm and not longer than 500 nm is higher than the reflectance in the visible region excluding this wavelength region. In particular, the reflectance (maximum value) of light having a wavelength of 450 nm is 35%. Further, in the reflectance distribution of Example 3, there is a peak having a maximum value (51%) at the wavelength of 1070 nm in the noticed infrared region, and the near-infrared region reflectance is as high as 26.15%.

In Example 4, the reflectance in the wavelength region not shorter than 440 nm and not longer than 520 nm is higher than the reflectance in a part, of the visible region, that exceeds 520 nm and is not longer than 730 nm. In particular, the reflectance (maximum value) of light having a wavelength of 480 nm is 20%. Further, in the reflectance distribution of Example 4, there is a peak having a maximum value (47%) at the wavelength of 1130 nm in the noticed infrared region, and the near-infrared region reflectance is as high as 24.97%.

In Example 5, the reflectance in the wavelength region not shorter than 450 nm and not longer than 530 nm is higher than the reflectance in a part, of the visible region, that exceeds 540 nm. In particular, the reflectance (maximum value) of light having a wavelength of 480 nm is 30%. Further, in the reflectance distribution of Example 5, there is a peak having a maximum value (49%) at the wavelength of 1130 nm in the noticed infrared region, and the near-infrared region reflectance is as high as 26.17%.

In Example 6, the reflectance in the wavelength region not shorter than 440 nm and not longer than 530 nm is higher than the reflectance in a part, of the visible region, that exceeds 530 nm. In particular, the reflectance (maximum value) of light having a wavelength of 480 nm is 40%. Further, in the reflectance distribution of Example 6, there is a peak having a maximum value (45%) at the wavelength of 1130 nm in the noticed infrared region, and the near-infrared region reflectance is as high as 22.99%.

In Example 7, the reflectance in the wavelength region not shorter than 390 nm and not longer than 450 nm is higher than the reflectance in a part, of the visible region, that exceeds 450 nm and is not longer than 760 nm. In particular, the reflectance (maximum value) of light having a wavelength of 420 nm is 25%. Further, in the reflectance distribution of Example 7, there is a peak having a maximum value (53%) at the wavelength of 990 nm in the noticed infrared region, and the near-infrared region reflectance is as high as 25.85%.

In Example 8, the reflectances in the wavelength region not shorter than 400 nm and not longer than 500 nm and in the wavelength region not shorter than 550 nm and not longer than 700 nm are higher than the reflectance in the wavelength region that exceeds 500 nm and is shorter than 550 nm. In particular, the reflectance (first maximum value) of light having a wavelength of 450 nm is 11%, and the reflectance (second maximum value) of light having a wavelength of 620 nm is also 11%. Further, in the reflectance distribution of Example 8, there is a peak having a maximum value (54%) at the wavelength of 910 nm in the noticed infrared region, and the near-infrared region reflectance is as high as 26.45%.

<<Durability>>

For each of Comparative Examples 1-1 to 4-3 and Examples 1-1 to 8-3, two tests regarding durability were performed. However, these tests were not performed on Comparative Examples 1-2 and 1-3 in which cracks were generated during film deposition.

One of the two tests is an accelerated-weathering adhesion test, and the other is a constant temperature/humidity test.

The accelerated-weathering adhesion test was performed as follows. First, 100 squares were formed on each of the surfaces of a lens, with a cutter. Next, adhesion of a cellophane tape to the portion where the squares were formed and forceful removal of the cellophane tape were repeated five times, and the number of squares that were peeled off was checked. Subsequently, the lens was charged into a sunshine weather-o-meter (S80B manufactured by Suga Test Instrument Co., Ltd.) for 60 hours (hr). Thereafter, cellophane tape was newly applied to the portion where the squares were formed, in the same manner as before charging of the lens, and the number of squares that were peeled off was counted. Thereafter, in the same manner as described above, the lens was charged into the sunshine weather-o-meter for 60 hours, and the number of squares that were peeled off was checked. Such charging of the lens and checking were repeated every 60 hours until checking was performed after the lens had been charged for 240 hours in total from the first charging.

The constant temperature/humidity test was performed by using a constant temperature/humidity test machine (LHU-113 manufactured by ESPEC CORP.). The temperature and the relative humidity inside a bath of the test machine were set at 60° C. and 95% RH, respectively, and a lens was charged into the bath. The lens was taken out from the bath after passage of 1 day, 3 days, and 7 days from charging of the lens, and it was visually checked whether or not appearance abnormality, such as swelling, change in color, or crack, occurred.

Among the results of the tests, the results regarding Comparative Examples 1-1 to 4-3 are shown in the following Table 5, while the results regarding Examples 1-1 to 8-3 are shown in the following Table 6.

TABLE 5

|  |  | Comparative Example 1 | | | Comparative Example 2 | | |
|---|---|---|---|---|---|---|---|
|  |  | Comparative Example 1-1 | Comparative Example 1-2 | Comparative Example 1-3 | Comparative Example 2-1 | Comparative Example 2-2 | Comparative Example 2-3 |
| Accelerated weathering adhesion test | Initial stage | 100/100 | Not evaluated due to crack | Not evaluated due to crack | 100/100 | 100/100 | 99.5/100 |
|  | 60 hr | 100/100 |  |  | 99/100 | 100/100 | 99.5/100 |
|  | 120 hr | 99.5/100 |  |  | 95/100 | 97/100 | 90/100 |
|  | 180 hr | 100/100 |  |  | 70/100 | 90/100 | 88/100 |
|  | 240 hr | 100/100 |  |  | 70/100 | 85/100 | 80/100 |
| Constant temperature/ humidity test | 1 day | No change |  |  | No change | No change | No change |
|  | 3 days | No change |  |  | No change | No change | No change |
|  | 7 days | Cracks |  |  | Cracks | No change | No change |

|  |  | Comparative Example 3 | | | Comparative Example 4 | | |
|---|---|---|---|---|---|---|---|
|  |  | Comparative Example 3-1 | Comparative Example 3-2 | Comparative Example 3-3 | Comparative Example 4-1 | Comparative Example 4-2 | Comparative Example 4-3 |
| Accelerated weathering adhesion test | Initial stage | 100/100 | 100/100 | 100/100 | 100/100 | 100/100 | 100/100 |
|  | 60 hr | 100/100 | 99.5/100 | 100/100 | 100/100 | 100/100 | 100/100 |
|  | 120 hr | 100/100 | 99.5/100 | 100/100 | 100/100 | 100/100 | 100/100 |
|  | 180 hr | 99/100 | 99/100 | 95/100 | 100/100 | 100/100 | 100/100 |
|  | 240 hr | 99/100 | 99/100 | 95/100 | 100/100 | 100/100 | 100/100 |
| Constant temperature/ humidity test | 1 day | No change | No change | No change | No change | No change | No change |
|  | 3 days | No change | No change | No change | No change | No change | No change |
|  | 7 days | Cracks | No change | No change | Cracks | No change | No change |

TABLE 6

|  |  | Example 1 | | | Example 2 | | |
|---|---|---|---|---|---|---|---|
|  |  | Example 1-1 | Example 1-2 | Example 1-3 | Example 2-1 | Example 2-2 | Example 2-3 |
| Accelerated weathering adhesion test | Initial stage | 100/100 | 100/100 | 100/100 | 100/100 | 100/100 | 100/100 |
|  | 60 hr | 100/100 | 100/100 | 100/100 | 100/100 | 100/100 | 100/100 |
|  | 120 hr | 100/100 | 100/100 | 100/100 | 100/100 | 100/100 | 100/100 |
|  | 180 hr | 100/100 | 100/100 | 100/100 | 100/100 | 100/100 | 100/100 |
|  | 240 hr | 100/100 | 100/100 | 100/100 | 100/100 | 100/100 | 100/100 |
| Constant temperature/ humidity test | 1 day | No change | No change | No change | No change | No change | No change |
|  | 3 days | No change | No change | No change | No change | No change | No change |
|  | 7 days | cracks | No change | No change | cracks | No change | No change |

|  |  | Example 3 | | | Example 4 | | |
|---|---|---|---|---|---|---|---|
|  |  | Example 3-1 | Example 3-2 | Example 3-3 | Example 4-1 | Example 4-2 | Example 4-3 |
| Accelerated weathering adhesion test | Initial stage | 100/100 | 100/100 | 100/100 | 100/100 | 100/100 | 100/100 |
|  | 60 hr | 100/100 | 100/100 | 100/100 | 100/100 | 100/100 | 100/100 |
|  | 120 hr | 100/100 | 100/100 | 100/100 | 100/100 | 100/100 | 100/100 |
|  | 180 hr | 100/100 | 100/100 | 100/100 | 100/100 | 100/100 | 100/100 |
|  | 240 hr | 100/100 | 100/100 | 100/100 | 100/100 | 100/100 | 100/100 |

TABLE 6-continued

|  |  | Example 5 | | | Example 6 | | |
| --- | --- | --- | --- | --- | --- | --- | --- |
|  |  | Example 5-1 | Example 5-2 | Example 5-3 | Example 6-1 | Example 6-2 | Example 6-3 |
| Constant temperature/ humidity test | 1 day | No change | No change | No change | No change | No change | No change |
|  | 3 days | No change | No change | No change | No change | No change | No change |
|  | 7 days | cracks | No change | No change | cracks | No change | No change |

|  |  | Example 5 | | | Example 6 | | |
| --- | --- | --- | --- | --- | --- | --- | --- |
|  |  | Example 5-1 | Example 5-2 | Example 5-3 | Example 6-1 | Example 6-2 | Example 6-3 |
| Accelerated weathering adhesion test | Initial stage | 100/100 | 100/100 | 100/100 | 100/100 | 100/100 | 100/100 |
|  | 60 hr | 100/100 | 100/100 | 100/100 | 100/100 | 100/100 | 100/100 |
|  | 120 hr | 100/100 | 100/100 | 100/100 | 100/100 | 100/100 | 100/100 |
|  | 180 hr | 100/100 | 100/100 | 100/100 | 100/100 | 100/100 | 100/100 |
|  | 240 hr | 100/100 | 100/100 | 100/100 | 100/100 | 100/100 | 100/100 |
| Constant temperature/ humidity test | 1 day | No change | No change | No change | No change | No change | No change |
|  | 3 days | No change | No change | No change | No change | No change | No change |
|  | 7 days | Cracks | No change | No change | Cracks | No change | No change |

|  |  | Example 7 | | | Example 8 | | |
| --- | --- | --- | --- | --- | --- | --- | --- |
|  |  | Example 7-1 | Example 7-2 | Example 7-3 | Example 8-1 | Example 8-2 | Example 8-3 |
| Accelerated weathering adhesion test | Initial stage | 100/100 | 100/100 | 100/100 | 100/100 | 100/100 | 100/100 |
|  | 60 hr | 100/100 | 100/100 | 100/100 | 100/100 | 100/100 | 100/100 |
|  | 120 hr | 100/100 | 100/100 | 100/100 | 100/100 | 100/100 | 100/100 |
|  | 180 hr | 100/100 | 100/100 | 100/100 | 100/100 | 100/100 | 100/100 |
|  | 240 hr | 100/100 | 100/100 | 100/100 | 100/100 | 100/100 | 100/100 |
| Constant temperature/ humidity test | 1 day | No change | No change | No change | No change | No change | No change |
|  | 3 days | No change | No change | No change | No change | No change | No change |
|  | 7 days | Cracks | No change | No change | Cracks | No change | No change |

In the constant temperature/humidity test, cracks were observed after passage of 7 days in Comparative Examples 1-1, 2-1, 3-1, 4-1 and Examples 1-1, 2-1, 3-1, 4-1, 5-1, 6-1, 7-1, 8-1 regarding the base having the refractive index of 1.60, whereas no cracks were observed in the other Examples and Comparative Examples even after passage of 7 days.

If no cracks are generated in a base even after the base has been exposed to the constant temperature/humidity environment for 3 days, this base can be regarded to have sufficient durability (heat resistance and humidity resistance). If no cracks are generated in a base even after passage of 7 days, this base can be regarded to have excellent durability. The reason why cracks were generated in the base having the refractive index of 1.60 after passage of 7 days is because the expansion coefficient of this base was higher than the expansion coefficients of the other bases.

Meanwhile, in the accelerated-weathering adhesion test, the number of peeled squares remarkably increased in Comparative Examples 2-1 to 2-3 after charging of the lens for 120 hours in total, which means that durability (adhesion after accelerated weathering) was not sufficient.

In Comparative Examples 3-1 to 3-3, peeled squares were found after charging of the lens for 180 hours in total, which also means that durability (adhesion after accelerated weathering) was not sufficient.

In Comparative Examples other than above and in all Examples, peeled squares after accelerated weathering were not observed, which means that excellent durability (adhesion after accelerated weathering) was achieved.

CONCLUSION

In Comparative Example 1, high reflectance is ensured in both the near-infrared region and the blue region within the visible region by, for example, the optical thickness of the $ZrO_2$ layer as the second layer being not less than $0.400 \times \lambda/4$ and not greater than $0.650 \times \lambda/4$. However, Comparative Example 1 has a seven-layer structure in which the optical thickness of the $SiO_2$ layer as the third layer is not greater than $0.230 \times \lambda/4$. Therefore, in Comparative Examples 1-2 and 1-3, linear cracks are generated during film deposition.

Comparative Example 2 has a nine-layer structure in which the optical thickness of the $ZrO_2$ layer as the second layer is not less than $0.400 \times \lambda/4$ and not greater than $0.650 \times \lambda/4$, the optical thickness of the $SiO_2$ layer as the third layer is not less than $0.230 \times \lambda/4$ and not greater than $0.560 \times \lambda/4$, and the optical thickness of the $SiO_2$ layer as the seventh layer is not less than $0.450 \times \lambda/4$ and not greater than $0.650 \times \lambda/4$. Therefore, high reflectance is ensured in both the near-infrared region and the blue region within the visible region, and generation of cracks during film deposition is avoided. In Comparative Example 2, however, peeling of the film occurs during the accelerated-weathering adhesion test because, for example, the optical thickness of the $SiO_2$ layer as the first layer is $0.350 \times \lambda/4$ which exceeds $0.120 \times \lambda/4$.

Comparative Example 3 has a nine-layer structure like Comparative Example 2, and the optical thickness of the SiO$_2$ layer as the first layer is 0.228×λ/4 which is thinner than that of Comparative Example 2 but still exceeds 0.120×λ/4. Therefore, as in Comparative Example 2, peeling of the film occurs during the accelerated-weathering adhesion test.

Comparative Example 4 has an eight-layer structure in which the ZrO$_2$ layer is the first layer, and the optical thicknesses of the respective layers are reduced in order to ensure the reflectance in the blue region. However, achievable reflectance in the infrared region is only about 7%.

In contrast to the above Comparative Examples, each of Examples 1 to 8 has a nine-layer structure, in which the optical thickness of the SiO$_2$ layer as the first layer counting from the base is not greater than 0.120×λ/4, the optical thickness of the ZrO$_2$ layer as the second layer is not less than 0.400×λ/4 and not greater than 0.650×λ/4, the optical thickness of the SiO$_2$ layer as the third layer is not less than 0.230×λ/4 and not greater than 0.560×λ/4, and the optical thickness of the SiO$_2$ layer as the seventh layer is not less than 0.450×λ/4 and not greater than 0.650×λ/4. Therefore, both the high reflectance in the near-infrared region (20% or more as an average value of reflectance, on one surface, in the wavelength region not shorter than 780 nm and not longer than 1500 nm) and the high reflectance in a partial region within the visible region are achieved, subject to the low reflectance in the other part of the visible region (preferably, 3% or less as an average reflectance, more preferably, 3% or less throughout the region, still more preferably, 1% or less as an average reflectance, and yet more preferably, 1% or less throughout the region). Furthermore, durability (non-peeling property during the accelerated-weathering adhesion test, and nondestructive property during the constant temperature/humidity test) is also ensured.

In particular, in Examples 1 and 2, light in the short wavelength region (not shorter than 400 nm and not longer than 420 nm) within the visible region is cut at the high reflectance together with near-infrared light, and the degree of cut is variable, i.e., the reflectance at the wavelength of 400 nm is 71% and 50%, respectively. Since light in such a short wavelength region (blue region) has high energy in the visible light, if the amount of the light reaching an eye is reduced, protection of the eye is achieved. Therefore, if spectacles are manufactured by using a spectacle lens produced according to Example 1 or 2, it is possible to provide spectacles which protect eyes from blue light and near-infrared light. Meanwhile, as the reflectance is higher (the transmittance is lower) only in the blue region within the visible region, the lens and the field of view exhibit yellow, which is a complementary color of blue. Since there is need to prevent yellow from being conspicuous while having the protection function from blue light, it is important that the magnitude of the reflectance in the blue region (maximum value) is adjustable. In Examples 1 and 2, the magnitude of the reflectance can be adjusted.

In Example 3, light in a partial region (not shorter than 420 nm and not longer than 500 nm) within the visible region is cut at the high reflectance together with near-infrared light. The maximum value of reflectance in the partial region is 35% at the wavelength of 450 nm, and therefore, light of 450 nm, at which the maximum value of spectral intensity distribution of LED lighting is present, and light of an adjacent wavelength, are cut together with near-infrared light. Therefore, if spectacles are manufactured according to Example 3, it is possible to provide spectacles which protect eyes and ensure well-balanced field of view under LED lighting. Furthermore, if an LED lighting cover having the same film as that of Example 3 is produced, the cover allows to protect eyes from LED lighting and to control the color of the LED lighting.

In each of Examples 4 to 6, light in a partial region (not shorter than 440 nm and not longer than 520 nm) within the visible region is cut at the high reflectance together with near infrared light. The maximum values of reflectance in the partial region are 20%, 30%, and 40%, respectively, at the wavelength of 480 nm, thereby providing lens or the like, which cuts light at the wavelength of 480 nm and in its adjacent region, and near-infrared light. In recent years, it has been discovered that light at the wavelength of 480 nm and in its adjacent region causes disordering of human biological clock if a person is exposed to the light at night (before going to bed). In Example 4, the light can be cut together with near-infrared light. In order to satisfy need for adjusting the tradeoff between the degree of protection from such light and visibility of visible light (naturalness of color) or the like, it is necessary to adjust the degree of cut rate of such light, that is, the magnitude of the maximum value of reflectance at the wavelength of 480 nm. In Examples 4 to 6, the degree (magnitude) is variable, so that the above need is satisfied. Examples of equipment that can generate such light include a display of portable electronic equipment such as a smartphone, a computer display, and a television set having LEDs as backlight.

In Example 7, light in the blue region (not shorter than 390 nm and not longer than 450 nm) within the visible region is cut at the high reflectance together with near-infrared light. While the maximum value of reflectance in the blue region is present at the wavelength of 400 nm in Examples 1 to 2, the maximum value is present at 420 nm in Example 7. In Example 7, the tradeoff between the performance to protect eyes from blue light, and the visibility such as color, or the like, is adjusted by changing the position of the maximum value.

In addition, in Example 8, lights in two partial regions (a wavelength region not shorter than 400 nm and not longer than 500 nm, and a wavelength region not shorter than 550 nm and not longer than 700 nm) within the visible region are cut at the high reflectance together with near-infrared light. In Example 8, as in Example 3, the maximum value of reflectance is present at the wavelength of 450 nm. If only light (blue light) at this wavelength and a wavelength in its adjacent region, of visible light, is cut, the color of transmitted light (transparent color) exhibits yellow, which is a complementary color of blue. In Example 8, in order to reduce the degree of yellow, light (yellow light) at the wavelength of 620 nm regarding a yellow region and a wavelength in its adjacent region is also cut at the high reflectance, whereby the transparent color is made close to white.

As described above, the optical multilayer film has a nine-layer structure, in which the optical thickness of the SiO$_2$ layer as the first layer counting from the base is not greater than 0.120×λ/4, the optical thickness of the ZrO$_2$ layer as the second layer is not less than 0.400×λ/4 (preferably, not greater than 0.650×λ/4), the optical thickness of the SiO$_2$ layer as the third layer is not less than 0.230×λ/4 (preferably, not greater than 0.560×λ/4), and the optical thickness of the SiO$_2$ layer as the seventh layer is not less than 0.450×λ/4 (preferably, not greater than 0.650×λ/4), thereby providing an optical product having high durability, which cuts light in the infrared region and light in a partial region within the visible region. The partial region can be variously set by adjusting the optical thicknesses of the other layers.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. An optical product comprising:
    a resin base;
    an optical multilayer film disposed on at least one surface of the base, directly or via an intermediate film; and
    a hard coating film provided in a position between the optical multilayer film and the resin base,
    wherein the optical multilayer film consists of nine alternating $SiO_2$ layers and $ZrO_2$ layers, disposed such that a first layer closest to the base is a $SiO_2$ layer,
    wherein an optical thickness of the $SiO_2$ first layer is not greater than $0.120 \times \lambda/4$, when a design wavelength $\lambda$ is 500 nm,
    wherein an optical thickness of a $ZrO_2$ layer, as a second layer, is not less than $0.400 \times \lambda/4$,
    wherein an optical thickness of a $SiO_2$ layer, as a third layer, is not less than $0.230 \times \lambda/4$,
    wherein an optical thickness of a $SiO_2$ layer, as a seventh layer, is not less than $0.450 \times \lambda/4$,
    wherein a combined optical thickness of a $ZrO_2$ layer having tensile stress, as a fourth layer, a $SiO_2$ layer having compressive stress, as a fifth layer, and a $ZrO_2$ layer having tensile stress, as a sixth layer, is sufficient to achieve a near-infrared light cutting effect by reflection,
    wherein the optical thickness of the $SiO_2$ layer, as the fifth layer, does not interfere with the near-infrared light cutting effect otherwise achieved by the fourth and sixth layers,
    wherein an average value of reflectance on one surface is not less than 20% in a range of 780 nm to 1500 nm,
    wherein the resin base is an episulfide resin having a refractive index of 1.70 or 1.76, and
    wherein the hard coating film is an organosiloxane resin containing inorganic oxide particles.

2. The optical product according to claim 1, wherein the optical thickness of the $ZrO_2$ layer, as the second layer, is not greater than $0.650 \times \mu/4$.

3. A plastic spectacle lens using the optical product according to claim 2.

4. Spectacles using the plastic spectacle lens according to claim 3.

5. The optical product according to claim 1, wherein the optical thickness of the $SiO_2$ layer, as the third layer, is not greater than $0.560 \times \lambda/4$.

6. A plastic spectacle lens using the optical product according to claim 5.

7. Spectacles using the plastic spectacle lens according to claim 6.

8. The optical product according to claim 1, wherein the optical thickness of the $SiO_2$ layer, as the seventh layer, is not greater than $0.650 \times \lambda/4$.

9. A plastic spectacle lens using the optical product according to claim 8.

10. Spectacles using the plastic spectacle lens according to claim 9.

11. A plastic spectacle lens using the optical product according to claim 1.

12. Spectacles using the plastic spectacle lens according to claim 11.

* * * * *